(12) United States Patent
Choi (10) Patent No.: US 9,042,843 B2
(45) Date of Patent: May 26, 2015

(54) DISTRIBUTED MOBILE PHONE SYSTEM

(76) Inventor: Sang Jun Choi, Seoul (KR)

( * ) Notice: Subject to any disclaimer, the term of this patent is extended or adjusted under 35 U.S.C. 154(b) by 1113 days.

(21) Appl. No.: 13/002,187

(22) PCT Filed: Jun. 19, 2009

(86) PCT No.: PCT/KR2009/003290
§ 371 (c)(1),
(2), (4) Date: Dec. 30, 2010

(87) PCT Pub. No.: WO2010/002127
PCT Pub. Date: Jan. 7, 2010

(65) Prior Publication Data
US 2011/0111748 A1    May 12, 2011

(30) Foreign Application Priority Data

Jul. 4, 2008  (KR) .................. 10-2008-0064830

(51) Int. Cl.
*H04B 1/38* (2006.01)
*H04M 1/725* (2006.01)
*H04M 1/00* (2006.01)
*H04M 11/00* (2006.01)

(52) U.S. Cl.
CPC ........ *H04M 1/7253* (2013.01); *H04M 1/72544* (2013.01); *H04M 2250/52* (2013.01)

(58) Field of Classification Search
CPC . H04W 88/06; H04B 7/0689; H04M 1/72544
USPC ........... 455/39, 41.2, 403, 422.1, 466, 556.1; 370/311, 318, 916
See application file for complete search history.

(56) References Cited

U.S. PATENT DOCUMENTS

| | | | |
|---|---|---|---|
| 2004/0072548 A1* | 4/2004 | Kikuchi | ...................... 455/232.1 |
| 2006/0123063 A1* | 6/2006 | Ryan et al. | .................... 707/201 |
| 2006/0172751 A1 | 8/2006 | Son et al. | |
| 2007/0124150 A1* | 5/2007 | Sinai | ............................. 704/500 |
| 2008/0039212 A1* | 2/2008 | Ahlgren et al. | ................. 463/46 |
| 2008/0146278 A1* | 6/2008 | Rofougaran | .................. 455/557 |
| 2008/0280647 A1* | 11/2008 | Wasserman | ................... 455/557 |

FOREIGN PATENT DOCUMENTS

| | | | | |
|---|---|---|---|---|
| AN | 10-2007-0043313 | | 4/2007 | |
| KR | 2001-0061330 | * | 7/2001 | ............... H04B 1/38 |
| KR | 10-2003-0011146 | | 2/2003 | |

(Continued)

OTHER PUBLICATIONS

English Tranlation of KR-2003-0011146 dated Feb. 2003 saved in PDF format.*

(Continued)

*Primary Examiner* — Ayodeji Ayotunde
(74) *Attorney, Agent, or Firm* — Haynes and Boone, LLP (57) ABSTRACT

A mobile phone system having an application processing function is physically separated into a network data processing device and an application data processing device. Here, the network data processing device configured to process data for voice calls and data calls is placed in one small and light-weight device, the application data processing device configured to perform a high-quality user interface and high-quality applications is placed in another device, and communication between the two devices is defined.

12 Claims, 4 Drawing Sheets

(56) References Cited

FOREIGN PATENT DOCUMENTS

| KR | 2003-0011146 | * | 2/2003 | ............... H04B 1/40 |
|---|---|---|---|---|
| KR | 2003-0065046 A | | 8/2003 | |
| KR | 10-2007-0018294 | | 2/2007 | |
| KR | 10-2008-0024596 | | 3/2008 | |

OTHER PUBLICATIONS

English Tranlation of KR-2001-0061330 dated Jul. 2001 saved in PDF format.*

English language abstract of KR Publication No. 10-2003-0011146, dated Feb. 6, 2003.

English language abstract of KR Publication No. 10-2007-0018294, dated Feb. 14, 2007.

English language abstract of KR Publication No. 10-2007-0043313, dated Apr. 25, 2007.

English language abstract of KR Publication No. 10-2008-0024596, dated Mar. 19, 2008.

PCT International Search Report and the Written Opinion mailed Feb. 17, 2010, in related International Application No. PCT/KR2009/003290.

PCT International Preliminary Report on Patentability mailed Nov. 4, 2010, in related International Application No. PCT/KR2009/003290.

* cited by examiner

Fig. 1

Prior Art

DISTRIBUTED MOBILE PHONE SYSTEM

TECHNICAL FIELD

The present invention relates to a mobile phone device, and more particularly, to the improvement of the configuration of a mobile phone system having a function of processing various applications. To this end, local area wireless communication may be used.

BACKGROUND ART

Supplementary devices for processing a variety of applications other than voice call and data call (i.e., essential functions) are mounted on a conventional mobile phone device.

The most common supplementary function is a digital camera device. A recent mobile phone device has a high-quality digital camera function of 8 million pixels. If this digital camera function is built in the mobile phone device, the mobile phone system usually requires camera components having a high picture quality and also a large-sized screen. This makes the mobile phone device heavy and expensive.

Furthermore, if a function of playing motion pictures is added to a mobile phone device, a screen having a higher picture quality is required, and an expensive processor for the mobile phone device is also required.

Furthermore, recently, as the screen resolution of a mobile phone device is increased and the performance of a central processor for processing multimedia is greatly improved, a variety of video games are increasingly included in the mobile phone device. Game software can be received on-line and then stored and installed in the mobile phone device.

Figure 1:
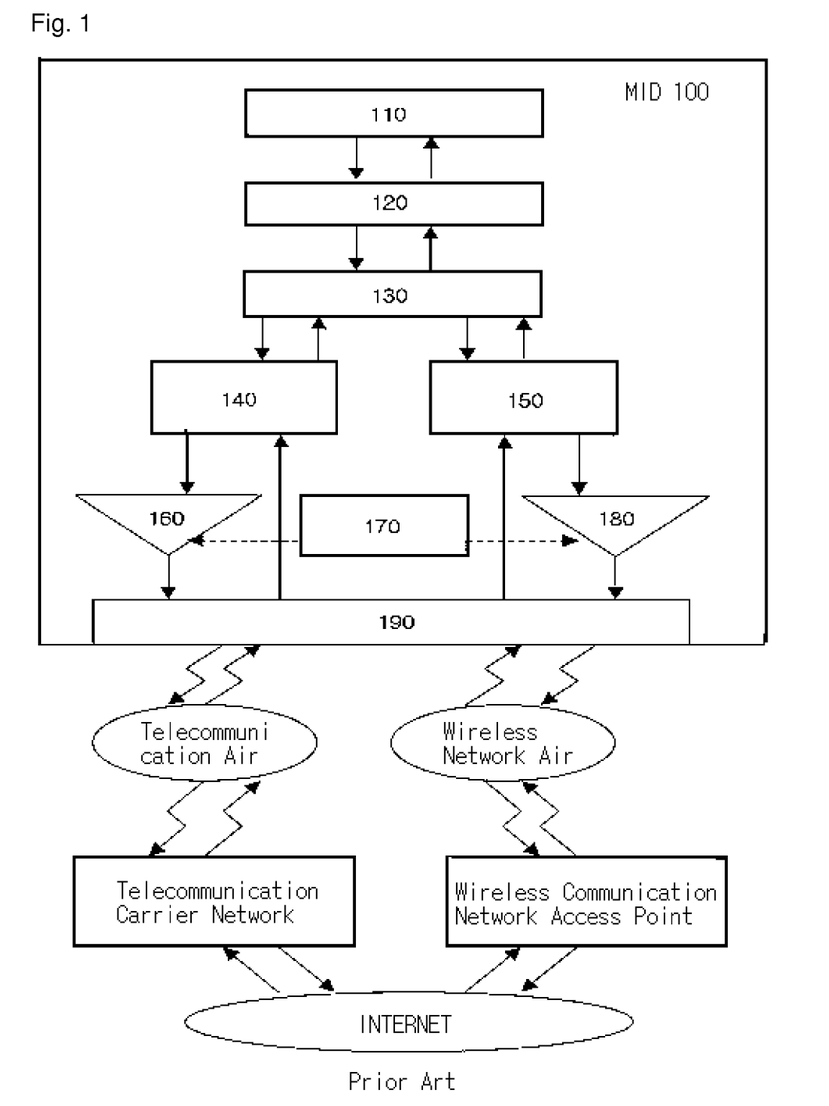
FIG. 1 is a diagram showing the configuration of a conventional MID.

Furthermore, a recent mobile phone device includes a wireless Internet function. In devices configured to process the wireless Internet function, a device called a Mobile Internet Device (MID) 100 is chiefly used. Major elements of the MID 100 include, as shown in FIG. 1, an input/output unit 110, an application processing unit 120, a network determination unit 130, a telecommunication processing unit 140, a wireless network processing unit 150, power amplifiers 160 and 180, a central control unit 170, and an antenna unit 190.

The elements of the MID (i.e., one of application devices of a mobile phone device) are described below. Although the MID includes many processing parts, only the above nine elements pertinent to the description of the present invention are described.

First, the input/output unit 110 may include a keypad for input, a display unit for output, a speaker, and so on. In the input/output unit 110, the size of the display unit gradually increases in line with advanced functions, and the input unit, such as a touch screen, is also advanced.

The application processing unit 120 includes applications, such as a web browser, e-mail, and a multimedia player, and a processor part for processing the applications. In order to process advanced applications, the application processing unit 120 further includes an application processor configured to process 3D and motion pictures having a high picture quality, other than a processor responsible for telecommunication processing.

The network determination unit 130 is a portion configured to determine a network that is now available and is configured to determine an available network between the telecommunication processing unit and the wireless network processing unit and then connect an available network thereto.

The telecommunication processing unit 140 is responsible for voice calls, data calls, etc. Here, a network protocol, such as CDMA or GSM, is commonly used. Further, evolved versions (e.g., EVDO, EVDV, WCDMA, UMTS, WiMAX, and LTE) of CDMA and GSM are used.

The wireless network processing unit 150 indicates an IEEE 802.11 series wireless LAN. Here, Wi-Fi is chiefly used as a communication protocol.

The power amplifier 160 is a power amplifier used in the telecommunication processing unit in order to wirelessly transmit transmission data. The power amplifier 180 is a power amplifier used in the wireless network processing unit in order to wirelessly transmit transmission data. In control of the power amplifier 160 and 180, the central control unit controls the turn-on or turn-off of the power amplifier 160 and 180 in software, and the degree of power amplification upon turn-on of the power amplifier is determined in accordance with a corresponding protocol. Data passing through the power amplifier is transmitted through an antenna unit 190 wirelessly. Reception data wirelessly transmitted to the antenna unit 190 is transmitted to the telecommunication processing unit and the wireless network processing unit which are then operated in accordance with respective corresponding protocols.

As shown in FIG. 1, when a user requests a wireless Internet function through the input/output unit 110 of the mobile phone, the application processing unit 120 executes a corresponding application, such as a web browser or e-mail, and the corresponding application requests network connection in order to execute TCP/IP or UDP/IP communication. In response thereto, the network determination unit 130 determines a network that is now available and connects the corresponding application to the determined network. Subsequent processes are carried out in accordance with a protocol defined in the telecommunication processing unit 140 or the wireless network processing unit 150.

Meanwhile, a concept of separating one mobile device into two or more devices and using the two or more devices is disclosed in Korean Patent Laid-Open Publication No. 10-2001-0061330, Korean Patent Laid-Open Publication No. 10-2003-0065046, etc. The documents disclose technologies for, in mobile phone device, separating an interface portion, such as an input/output device, from a main body and using them. The separated interface portion can communicate with the main body in real time using wireless communication technologies, such as infrared communication or Bluetooth. According to this technology, the interface module can be made light-weight and thin.

DISCLOSURE OF INVENTION

Technical Problem

A conventional mobile phone device has the following problems because a variety of supplementary devices are mounted on the mobile phone device in order to process various applications other than voice calls and data calls.

First, with the development of communication environments and advanced applications provided, components, such as a processor and memory, become complicated and bulky, resulting in a large-sized and heavy device. In particular, the portability of a mobile phone device is lowered because the size of a screen increases in order to display a great amount of information on one screen.

Furthermore, voice calls were chiefly used in the past, but recently the use of applications pertinent to multimedia is increasing. Accordingly, in devices, such as handheld phones or PDAs, the functions of applications are relatively reinforced. In order to display multimedia content including images or text on the screen and increase the display characteristic of data information, the external appearance of a mobile phone has a wide breadth. Users who are accustomed to a screen having a high height in order to display information for voice calls feel inconvenient when grasping a mobile phone having the wide breadth.

Furthermore, in order to support advanced functions, a large-sized screen is used and additional application processors are included. Accordingly, the price of a device rises.

A camera or motion picture play device is not chiefly combined with a communication function, but wireless Internet technologies using conventional MID devices further have the following problems.

First, communication and synchronization processings between a processor used in the application processing unit and a processor for the telecommunication processing unit or the wireless network processing unit are required because the processors differ from each other. However, the processings are very complicated and difficult. Accordingly, development environments for the communication devices gradually become poor.

Furthermore, communication service providers, etc. which chiefly supply and demand mobile phones perform a certification test in order to check whether the mobile phones supplied by manufacturers operate properly on the network of the communication service providers. In this certification procedure, not only portions regarding telecommunication processing, but portions regarding wireless network processing are included in the mobile phone certification test. Accordingly, the mobile phone certification procedure is long and complicated.

Furthermore, a royalty fee for a patent source technology for the latest telecommunication is for the most part calculated in proportion to the total price of a device. In this case, if the price of the device rises according to advanced devices, a royalty fee for telecommunication also rises and the added royalty fee causes a burden on the manufacturer of the device. For example, this is true of a royalty fee for the original CDMA technology owned by Qualcomm Inc.

As described above, devices from which an interface module, etc. can be separated are disclosed. The disclosed technologies are, however, disadvantageous in that the separated module may not be used as an independent communication element. That is, in the above devices, only interface elements are physically separated from the respective devices. Accordingly, only when the separated element and the main body are used together, they can perform one complete communication function.

In order to solve the above-described issues, the present invention uses a structure to be described later. Further, reference numerals within parentheses, supplementary descriptions, etc. are provided to indicate that they comply with embodiments to be described later in order to facilitate the understanding of the present invention and should not be construed to limit the present invention.

Technical Solution

The present invention relates to physically separating a mobile phone device, having a function of processing various applications, into a network data processing device and an application data processing device and defining communication between the separated processors. In particular, the present invention relates to an invention, enabling the development of a light-weight and small-sized mobile phone by separating complicated and diversified application functions.

According to the present invention, a mobile phone device having an application processing function is physically separated into a network data processing device for voice calls and data calls and an application data processing device for a variety of supplementary application functions, such as a camera, the play of motion pictures, game, and wireless Internet. Here, the network data processing device configured to process data for voice calls and data calls is placed in one small and light-weight device, the application data processing device configured to perform a high-quality user interface and high-quality applications is placed in another device, and communication between the two devices is defined. In particular, the concept of the present invention also includes separating the configuration of a MID device, having a communication function, into a network data processing device and an application data processing device and defining communication in each of the separated network data processing device and the separated application data processing device by improving the configuration of the MID device.

The above objects or further objects, characteristics, aspects, and advantages of the present invention will become more apparent from the following detailed description taken in conjunction with the accompanying drawings.

Advantageous Effects

According to the present invention, a high-quality application processor and a large-sized screen are separated from a network data processing device. Here, the application data processing device portion may be heavy and expensive. Thus, if, although the application data processing device portion is separately carried, the network data processing device is designed to be small and simple, mobile phones which are small and light-weight and can be worn on the body, such as a watch phone, a necklace-type phone, a pen-type phone, and other wearable accessory-type phones, can be developed.

Furthermore, since a device for performing telecommunication and a device for processing applications are separated from each other, a screen having a high height as in the prior art can be used for telecommunication. Accordingly, a user may feel satisfied with a feeling of grasp for voice calls.

Furthermore, when a user wants to replace a device, the user may replace the network data processing device or the application data processing device selectively. Accordingly, although application functions are advanced, a rise in the price of the device for telecommunication can be avoided, and a user's choice for devices is widened.

Furthermore, since the network data processing device and the application data processing device can be developed separately or at the same time, it is advantageous in terms of development environments.

Furthermore, a communication service provider can perform a certification test fast and conveniently because a network data processing function is simplified.

Furthermore, although the device for an application function is advanced, a royalty fee added to the device for voice call does not increase. Accordingly, an overall price of the device can be lowered.

Furthermore, an available service area can expand to the coverage of communication carrier by connecting the network data processing device and a device using the existing Wi-Fi, etc. as network transport means.

Furthermore, since the Power Amplifier (PA) of the network data processing device is used in common, the volume, material cost, and power consumption of a device can be reduced.

Furthermore, although the network data processing device and the application data processing device operate with them being connected to each other, they may operate independently even if the connection therebetween is disconnected resulting from the distance between them, wireless environments, and other conditions.

BRIEF DESCRIPTION OF DRAWINGS

Further objects and advantages of the invention can be more fully understood from the following detailed description taken in conjunction with the accompanying drawings in which.

In the accompanying drawings of the present application, the flow of data indicated by a straight line denotes the flow of wired data, and the flow of data indicated by a bent line denotes the flow of wireless data. A control line indicating control of elements is indicated by a dotted arrow. Although a central control unit actually controls all elements, the remaining control lines are not shown in order to emphasize the parts necessary for the present invention.

BEST MODE FOR CARRYING OUT THE INVENTION

The present invention will now be described in detail in connection with specific embodiments with reference to the accompanying drawings.

Figure 2:
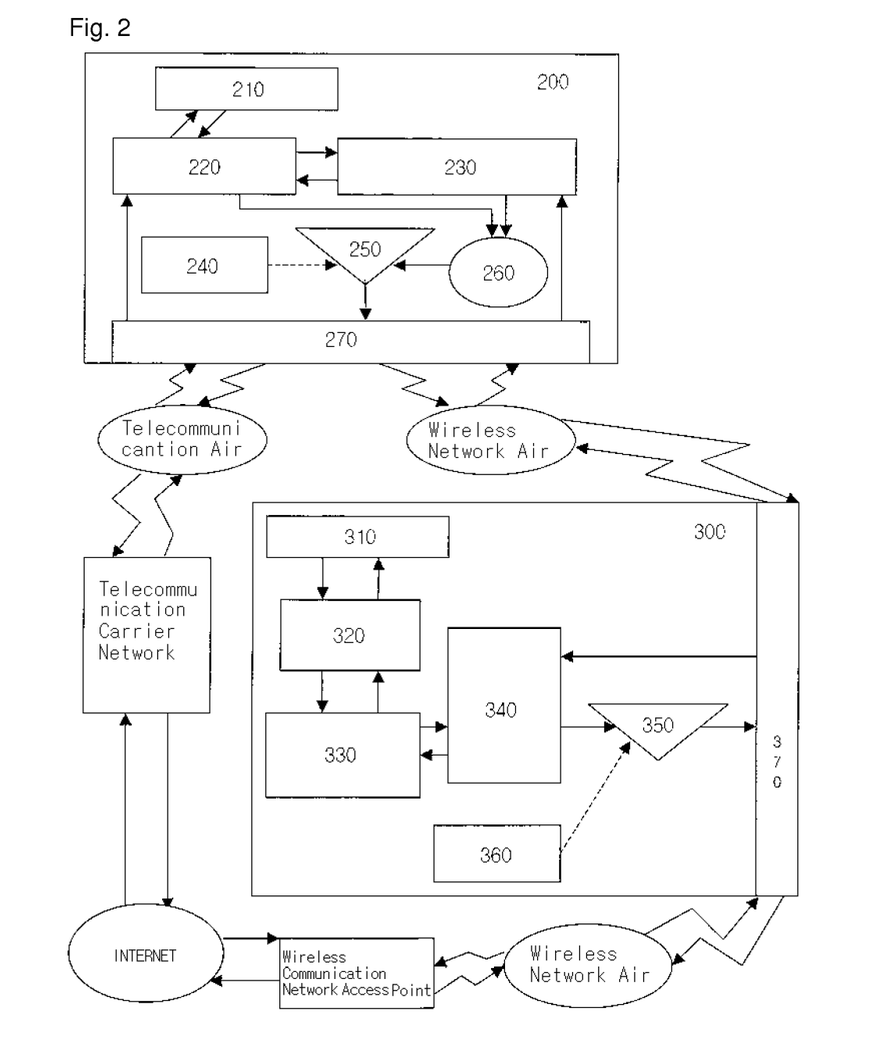
FIG. 2 is a diagram showing the configuration of a distributed MID according to a preferred embodiment of the present invention.

As shown in FIG. 2, a distributed mobile phone Internet device according to the present invention includes a network data processing device 200 and an application data processing device 300. The network data processing device 200 includes an input/output unit 210, a telecommunication processing unit 220, a wireless communication processing unit 230, a central control unit 240, a power amplifier 250, a mixer 260, and an antenna unit 270. The application data processing device 300 includes an input/output unit 310, an application processing unit 320, a wireless communication determination unit 330, a wireless communication processing unit 340, a power amplifier 350, a central control unit 360, and an antenna unit 370. The function of each of the elements is described below.

The elements of the network data processing device 200 are first described. The input/output unit 210 is a portion configured to process a basic screen output and/or key input. A small-sized black or color screen may be used as the input/output unit 210. The input/output unit may have only minimum functions or use voice or wireless frequency, if appropriate. Accordingly, the external physical appearance of the input/output unit may not exist. The keypad and screen may be very limited or may not exist. The telecommunication processing unit 220 is responsible for voice calls, data calls, etc. The telecommunication processing unit 220 uses a network protocol, such as CDMA or GSM, or an evolved version of the network protocol, such as EVDO, EVDV, WCDMA, UMTS, WiMAX, or LTE. The wireless communication processing unit 230 is a portion for communication with the application data processing device and is configured to include local area communication. The wireless communication processing unit 230 uses a local area communication protocol, such as Wi-Fi or Bluetooth. Alternatively, the wireless communication processing unit 230 may use a RFID, ZigBee, or IEEE 802.11 series wireless communication protocol. The network data processing device 200 and the application data processing device 300 may also communicate with each other in a wired manner as well as the local area wireless communication.

Data transmitted by the telecommunication processing unit 220 and data transmitted by the wireless communication processing unit 230 are mixed in the mixer 260 and then sent to the power amplifier 250. At this time, the central control unit 240 compares transmission power requested by the telecommunication processing unit 220 and transmission power requested by the wireless communication processing unit 230 in accordance with a corresponding protocol, determines a greater one of the two transmission powers, and wirelessly transmits the data using the determined transmission power through the antenna unit 270.

The elements of the application data processing device 300 are described below. The input/output unit 310 includes a keypad, a screen, etc. in the same as the input/output unit 210 and corresponds to a portion having a gradually larger screen according to advanced functions and advanced input devices, such as a touch screen. The application processing unit 320 is a processor portion configured to process applications, such as a web browser, e-mail, a multimedia player, a camera, and game. The application processing unit 320 further includes an application processor configured to process 3D and high-picture quality motion pictures in order to process advanced applications as well as a processor configured to perform communication. The wireless communication determination unit 330 determines whether to communicate with the network data processing device or other wireless communication devices. The wireless communication processing unit 340 is responsible for wireless communication with the network data processing device and uses local area wireless communication, such as a Wi-Fi, Bluetooth, RFID, ZigBee, or IEEE 802.11 series wireless communication protocol, according to a communication method. In the case of transmission data, the central control unit 360 controls the power amplifier 350 so that the power amplifier 350 transmits the transmission data through the antenna unit 370 according to a corresponding communication method.

The operation of the present invention is described below. First, the operation of the network data processing device 200 is first described.

(A) Connection to the Application Data Processing Device

The wireless communication processing unit 230 (i.e., in an initial sleep mode) is waken and connected in accordance with a preset wireless communication protocol. If there is no problem in the current consumed by the wireless communication processing unit 230, the sleep mode may not be set. After the connection, data synchronization between the two devices is immediately performed. Further, even when a synchronization item or data of the item has been added or modified in the network data processing device 200 or the application data processing device 300, data synchronization is immediately performed. The synchronization item includes contact data (e.g., a name, a figure, a telephone number, and an address), SMS/MMS data, instant message data, wallpaper data, ring tone data, alarm data, and call history data.

In the case of the reception and transmission of a voice call and the reception and transmission of an instant message, SMS, and MMS, contact data, incoming/sending wallpaper data, call history data, ring tone voice data, etc. associated with a corresponding telephone number are required. Here, the corresponding telephone number is received along with event information (i.e., voice call reception/transmission, instant message reception/transmission, SMS reception/transmission, and MMS reception/transmission) from the network data processing device. In the case of alarm, when the time of the application data processing device matches an alarm time, a set alarm sound, a wallpaper, etc. are displayed or played irrespective of a connection status.

In the present invention, the network data processing device preferably has a small size so that it can be portable or worn. Thus, the network data processing device may not include a screen, a sound source player, a keyboard, etc. Accordingly, it is preferred that synchronization data is displayed in the application data processing device or output in the form of voice. The application data processing device includes input/output unit, such as a screen, a sound source player, and a keyboard, and so requires synchronized data when at least one of the synchronization item and data thereof is edited or set.

The network data processing device and the application data processing device do not need to fetch corresponding data in real time because they basically have the same data according to a synchronization policy. However, if there is a communication obstacle upon synchronization or there is no space in the memory of the network data processing device, the network data processing device may fetch the corresponding data from the application data processing device in real time.

(B) Status Update

The network data processing device 200 periodically transmits information about the device to the application data processing device 300. The device information is status information frequently found in the mobile phone and includes a variety of icons, such as display of the signal strength of an antenna, display of the remaining battery capacity, display of a call status, display of messages, and GPS data.

(C) Sending/Incoming Voice Call

Sending voice call is required through the input/output unit 210. Subsequent operations are performed through the telecommunication processing unit 220 in the same manner as the existing mobile phone processing method.

Incoming voice call is performed through the telecommunication processing unit 220. When the network data processing device 200 and the application data processing device 300 are connected to each other, reception information is sent to the application data processing device 300 through the wireless communication processing unit 230.

In the case where the application data processing device 300 transmits a voice call, transmission information is transmitted to the network data processing device 200 through the wireless communication processing unit 340. The telecommunication processing unit 220 processes the received information in the same manner as the existing mobile phone processing method.

Upon transmission and reception, the same information as the existing mobile phone is displayed with reference to the data synchronized in (A).

(D) Data Transmission

Data transmitted by the application data processing device 300 in accordance with a local area wireless communication network protocol (e.g., Wi-Fi, Bluetooth, RFID, ZigBee, or IEEE 802.11 series) is immediately transferred to the telecommunication processing unit 220 via the wireless communication processing unit 230 of the network data processing device 200. The data is transferred to a communication service provider network via a communication carrier network in accordance with a corresponding protocol. Further, data transferred via the communication carrier network in accordance with a telecommunication protocol (CDMA, GSM, EVDO, EVDV, WCDMA, UMTS, WiMAX, LTE, etc.) is immediately transferred to the wireless communication processing unit 230 via the telecommunication processing unit 220. The data is then transferred to the application data processing device 300 in accordance with a corresponding protocol.

(E) Release of Connection to the Application Data Processing Device

When the connection is released in accordance with the currently used wireless communication protocol, status update is stopped. Even if the connection is released, the reception and transmission of voice and data calls are independently performed in the network data processing device 200. In this case, the data synchronized in (A) is used. When the connection is released, the wireless communication processing unit 230 may switch back to a sleep mode in order to minimize power consumption.

(F) Transmission Power Amplifier (PA) Used in Common

Data transmitted by the telecommunication processing unit 220 and data transmitted by the wireless communication processing unit 230 are mixed in the mixer 260 and then sent to the power amplifier 250. At this time, the central control unit 240 compares transmission power requested by the telecommunication processing unit 220 and transmission power requested by the wireless communication processing unit 230 according to a corresponding protocol, determines a greater one of the two transmission powers, and wirelessly transmits the data using the determined transmission power through the antenna unit 270.

The operation of the application data processing device 300 is described below.

(G) Connection to the Network Data Processing Device 200

In the case where the wireless communication determination unit 330 connects to the network data processing device through the wireless communication processing unit 340, a connection method is the same as the network data processing device.

(H) Status Update

Information, including the reception sensitivity of wireless communication, transmitted by the network data processing device is updated.

(I) Voice Call Transmission/Reception

When there is a request to transmit a voice call through the input/output unit 310, the request is transmitted to the network data processing device 200 via the wireless communication processing unit 340. When a connection to the network data processing device is established and the voice call is received, the reception information is transmitted through the wireless communication processing unit 340 and then processed as if it is displayed on the existing MID or the mobile phone.

(J) Data Transmission

When a user requests a wireless Internet function through the input/output unit 310 of the application data processing device, a corresponding application, such as a web browser or e-mail, is executed. The corresponding application requests network connection in order to perform TCP/IP or UDP/IP communication. At this time, the wireless communication determination unit 330 checks a network (telecommunication network or wireless LAN) that is now available and finally determines a connection network based on the user's preference.

When a connection to the telecommunication network is established, network data is transferred to the network data processing device 200 via the wireless communication processing unit 340. The network data is then transferred in accordance with a telecommunication network protocol. In the case where a connection is established through a wireless LAN, the application data processing device 300 transmits the network data in accordance with a protocol defined in the wireless LAN.

MODE FOR THE INVENTION

The example in which the application data processing device is separated has been chiefly described on the basis of the wireless Internet function from among application functions of a mobile phone device. A variety of additional embodiments using the present invention are described below.

Figure 3:
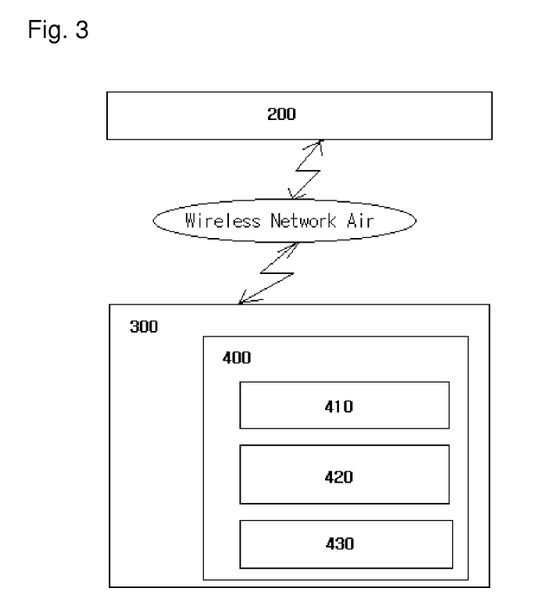
FIG. 3 is a diagram showing the deployment of a camera module according to a preferred embodiment of the present invention.

FIG. 3 shows an example in which a camera module 400 is added to the application data processing device. The camera module includes an input unit 410, a multimedia data processing unit 420, and an output unit 430. The input unit 410 is configured to include a lens, an image sensor (CCD or CMOS), a microphone, etc. The multimedia data processing unit 420 is configured to store input video images, still images, or voice data and perform processing, such as conversion, using an adequate codec. The output unit 430 includes a play device, such as a screen for playing processed multimedia data, or a speaker.

Here, the multimedia data processing unit 420 may be replaced with the application processing unit 320 or may constitute some of the application processing unit 320. Further, the output unit 430 may be replaced with the input/output unit 310 or may constitute some of the input/output unit 310.

Figure 4:
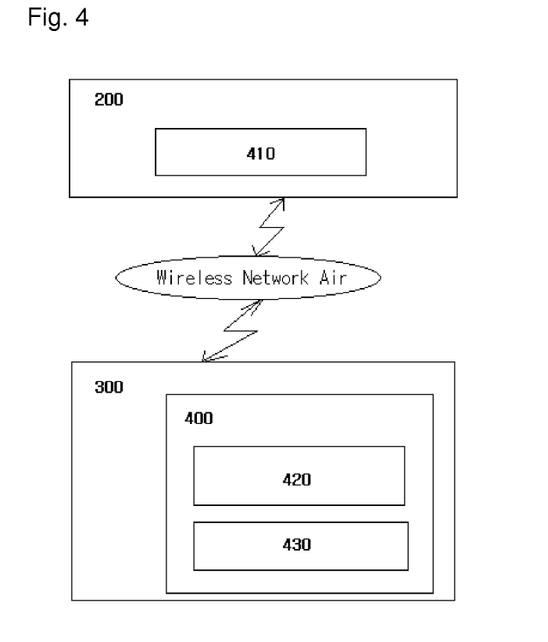
FIG. 4 is a diagram showing another deployment of the camera module according to a preferred embodiment of the present invention.

FIG. 4 shows a configuration in which, in the camera module of FIG. 3, the input unit 410 is included in the network data processing device, and the multimedia data processing unit 420 and the output unit 430 are included in the application data processing device 300. Photographing, capturing image, or recording may become more facilitated because the input unit 410 is added to the network data processing device 200 having a small size and a light weight. In this case, an input multimedia data signal may be wirelessly transmitted to the application data processing device 300 through the wireless communication processing unit 230 of the network data processing device 200. The transmitted data is then transmitted to the outout unit 430 via the multimedia data processing unit 420 as in FIG. 3.

As another example, an image signal transferred through the input unit 410 may be immediately transmitted to the communication service provider via the telecommunication processing unit 220 over the communication carrier network. In both cases, since video information gathered through the input unit 410 is divided and processed in separated devices, a gathering device and a video data processing device, the size of the gathering device can be reduced and the video data processing device can be complicated.

In yet another embodiment of the present invention, the application data processing device 300 may include a game function. In order to process the game function, the input/output unit 310 and the application processing unit 320 of the application data processing device can be used.

Figure 5:
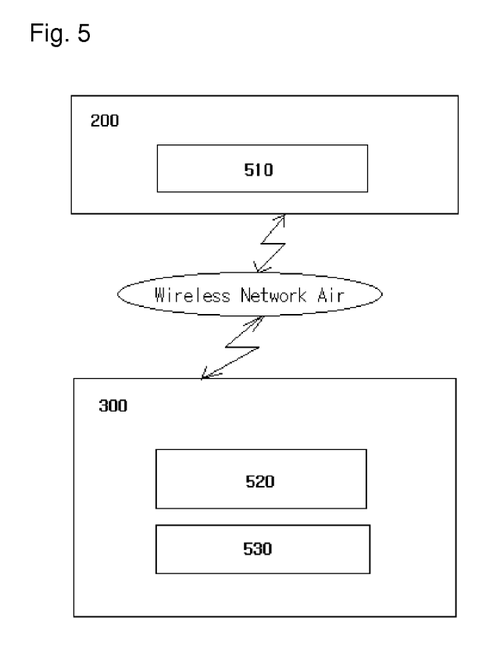
FIG. 5 is a diagram showing the deployment of a game module according to a preferred embodiment of the present invention.

FIG. 5 shows an embodiment modified in order to execute a game application using the present invention. Here, a device for receiving a command to execute a game is not the input/output unit 310 of the application data processing device, but an input unit 510 of the network data processing device. A game operation command input through the input unit 510 is transmitted to the wireless communication processing unit 340 of the application data processing device 300 via the wireless communication processing unit 230 and then input to a game processing unit 520 configured to execute a game application. An output unit 530 performs a function of displaying a game screen on the output screen of the application data processing device 300.

Here, the input unit 510 may be replaced with the input/output unit 210 or may constitute some of the input/output unit 210. The game processing unit 520 may be replaced with the application processing unit 320 or may constitute some of the application processing unit 320. The output unit 530 may be replaced with the input/output unit 310 or may constitute some of the input/output unit 310.

According to the embodiment shown in FIG. 5, a user who uses a game using a mobile phone device can use the network data processing device 200 as if using a remote joystick and enjoy the game more realistically. Further, a game can be controlled more easily because a game operation command is transmitted wirelessly using the network data processing device 200 having a small size and a light weight.

Although the specific embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A mobile phone system comprising:
   a network data processing device including a telecommunication processing unit configured to connect to a telecommunication network and perform a voice call and a data call, and
   an application data processing device configured to be capable of being connected to the network data processing device, the application data processing device including an application processing unit configured to be capable of processing at least one application,
   wherein the network data processing device comprises:
   a first wireless communication processing unit configured to perform communication with the application data processing device,
   a mixer configured to mix a telecommunication data signal transmitted by the telecommunication processing unit to the telecommunication network and a wireless communication data signal transmitted by the first wireless communication processing unit to the application data processing device,
   a power amplifier configured to amplify a signal received from the mixer,
   a central control unit configured to control a transmission power of the power amplifier, and
   an antenna unit configured to transmit a power-amplified signal wirelessly, wherein the central control unit is configured to compare a transmission power requested by the telecommunication processing unit and a transmission power requested by the first wireless communication processing unit, and control the power amplifier to supply a greater one of the two requested transmission powers.

2. The mobile phone system according to claim 1, wherein the network data processing device and the application data processing device are configured to communicate with each other so that data of the network data processing device and data of the application data processing device can be synchronized with each other, wherein the synchronization is carried out when the network data processing device and the application data processing device are connected to each other or when at least one of the synchronization item and data thereof is added or modified in at least one of the network data processing device and the application data processing device.

3. The mobile phone system according to claim 1, wherein the network data processing device and the application data processing device are configured to independently perform a voice and data call function and an application function, respectively, irrespective of whether a communication connection between the network data processing device and the application data processing device is established.

4. The mobile phone system according to claim 1, wherein the application data processing device comprising:
an input/output processing unit configured to perform interface with a user,
a wireless communication determination unit configured to determine whether to communication through the telecommunication network or wireless LAN,
a second wireless communication processing unit configured to perform communication with the network data processing device, and means for communicating with the wireless LAN,
wherein the wireless communication determination unit determines to communicate through the telecommunication network when a voice call or a data call is received by the second wireless communication processing unit.

5. The mobile phone system according to claim 2, wherein the synchronization includes at least one of contact, SMS/MMS, instant message, wallpaper, ring tone, alarm, and call history.

6. The mobile phone system according to claim 2, wherein, when a voice call or a data call is received by the telecommunication processing unit, the application data processing device receives at least part of the reception information from the network data processing device and displays, using the input/output processing unit, synchronized data that are already stored in the application data processing unit and are associated with at least part of the reception information.

7. The mobile phone system according to claim 4, wherein the wireless communication determination unit determines the network to be used for communications according to the user's choice when the user's choice is received by the input/output processing unit.

8. The mobile phone system according to claim 4, wherein when a voice call or a data call is received by the telecommunication processing unit, the application data processing device receives reception information via the first and second wireless communication processing units and displays the reception infoi iation through the input/output processing unit.

9. The mobile phone system according to claim 1, further comprising a camera module, wherein the camera module comprises an input unit configured to receive a video or voice signal, a multimedia data processing unit configured to process and store the video or voice signal, inputted through the input unit, and an output unit configured to output the processed video or voice signal,
wherein the network data processing device comprises the input unit;
wherein the application data processing device comprises the multimedia data processing unit and the output unit; and
wherein the signal from the input unit is transmitted to the application data processing device via the wireless communication processing unit or transmitted to a communication service provider via the telecommunication processing unit over a communication carrier network.

10. The mobile phone system according to claim 1, further comprising a game module, wherein the game module comprises an input unit configured to receive a game operation command, a game processing unit configured to receive the game operation command inputted through the input unit and process a game, and an output unit configured to output the processed video or voice signal;
wherein the network data processing device comprises the input unit;
wherein the application data processing device comprises the game processing unit and the output unit; and
wherein the a signal from the input unit is transmitted to the application data processing device via the wireless communication processing unit.

11. A mobile phone device comprising:
a telecommunication processing unit configured to connect to a telecommunication network and perform a voice call and a data call,
a wireless communication processing unit configured to perform local communication with an external application processing device,
a mixer configured to mix a telecommunication data signal transmitted by the telecommunication processing unit to the telecommunication network and a wireless communication data signal transmitted by the wireless communication processing unit to the external application processing device,
a power amplifier configured to amplify a signal received from the mixer,
a central control unit configured to control a transmission power of the power amplifier, and
an antenna unit configured to transmit a power-amplified signal wirelessly,
wherein the central control unit is configured to compare a transmission power requested by the telecommunication processing unit and a transmission power requested by the first wireless communication processing unit, and control the power amplifier to supply a greater one of the two requested transmission powers.

12. The mobile phone system according to claim 3, wherein, when a voice call or a data call is received by the telecommunication processing unit, the application data processing device receives at least part of the reception information from the network data processing device and displays, using the input/output processing unit, synchronized data that are already stored in the application data processing unit and are associated with at least part of the reception information.

* * * * *